United States Patent [19]

Gould

[11] Patent Number: 4,570,444
[45] Date of Patent: Feb. 18, 1986

[54] SOLAR MOTOR MEANS

[76] Inventor: Walter Gould, Calimesa, Calif. 92320

[21] Appl. No.: 661,057

[22] Filed: Oct. 15, 1984

[51] Int. Cl.$^4$ ............................................... F03G 7/00
[52] U.S. Cl. ......................................... 60/675; 60/531
[58] Field of Search .................................. 60/675, 531

[56] References Cited

U.S. PATENT DOCUMENTS

| | | | |
|---|---|---|---|
| 3,509,716 | 5/1970 | Avery | 60/675 X |
| 3,659,416 | 5/1972 | Brown | 60/675 |
| 4,012,911 | 3/1977 | Gulko | 60/675 X |
| 4,121,420 | 10/1978 | Schur | 60/675 X |

*Primary Examiner*—Allen M. Ostrager
*Attorney, Agent, or Firm*—John H. Crowe

[57] ABSTRACT

A solar-powered motor with a wheel-like rotor having a rim separated into hollow compartments. The rotor is designed to revolve around a horizontal axis while containing a volatile liquid in some of its rim compartments. The rotor has a hub, also with separate compartments, and hollow spokes interconnecting the hub with the rim compartments. The interior of the rotor is designed to receive a compressed gas in its hub and sequentially route it, through the hollow spokes, to rim compartments on one side of the rotor axis. When the compressed gas makes contact with the liquid surface in that part of the rim it exerts pressure on that surface. The pressure on the liquid surface forces the liquid to the opposite side of the rotor and into the rim, through an interconnecting series of passageways in the spokes and hub, at a level higher than its original level. This results in an imbalance of weight on one side of the rotor which causes the rotor to turn or rotate under the influence of gravity in a direction tending to restore its weight balance. The rotor continues to rotate as long as the compressed gas is fed into its hub. The compressed gas can be the vapor phase of the volatile liquid in the rotor.

19 Claims, 8 Drawing Figures

SOLAR MOTOR MEANS

BACKGROUND OF THE INVENTION

This invention relates generally to a solar motor system, and more particularly to such a system having a rotor in the form of a substantially hollow wheel that rotates under the influence of a weight imbalance created by shifting liquid within its hollow interior.

Various devices have been proposed for converting heat energy to mechanical energy through the alternate vaporization and condensation of volatile liquids. One such device is shown in U.S. Pat. No. 1,911,456. That device involves one or more pairs of bulbs in fluid interconnection and containing a volatile liquid. One bulb of each pair is shielded from solar energy, while the other is exposed to solar energy. The exposed bulb becomes heated and forces the liquid through an interconnecting passage to the other bulb thereby creating a mechanical imbalance and causing rotation of the device. U.S. Pat. No. 3,509,716 to Avery discloses a thermal engine in which a plurality of tanks are arranged in a circumferential path. Opposite pairs of the tanks are interconnected by fluid passages. The circumferential array of tanks is mounted for rotation in a vertical plane and the tanks contain a volatile liquid. The lower tank of each pair is heated at the bottom of its orbit and the upper tank concurrently cooled by a water spray. The heated liquid in the lower tank vaporizes and rises through an interconnecting passage to the upper tank, where it is cooled and condensed. The contrasting presence of liquid in the upper tank and vapor in the lower tank results in an imbalance in the structure which causes it to rotate. U.S. Pat. No. 4,074,534 to Morgan discloses a thermodynamic motor comprising a plurality of diagonally opposed pairs of tanks mounted on a rotatable frame. A diaphragm separates each tank into inner and outer chambers, the inner chambers of opposing pairs of tanks being interconnected by a conduit. A fluid is carried in the inner chambers and conduit and there is at least one radiator communicating with the outer chamber of each tank. A volatile liquid substantially fills each radiator. The radiator of the lower tank is at least partially immersed in a heated liquid at the bottom of its orbital path to volatilize the liquid therein. The resulting vapor pressure distends the diaphragm in that tank, forcing the fluid from the inner chamber of the lower tank to the inner chamber of the opposing tank to create an unbalanced condition which causes rotation of the motor. U.S. Pat. No. 4,143,517 to Compton relates to another thermal engine for converting heat energy into mechanical energy. This engine has a rotor with a main shaft suppoting a plurality of vapor chambers communicating with a condenser across appropriate check valves and rotary valves to form a closed loop system. A liquid in the vapor chambers is vaporized and discharged as a high pressure gas to the condenser, then returned as a liquid to the rotor, thereby imparting rotational movement to the rotor.

All but one of the above-mentioned prior art devices involve rotors with oppositely positioned containers or tanks in which volatile liquids are confined. Rotational movement of the device is, in each case, caused by the vaporization of a liquid and subsequent imbalance of a rotor structure through actual transfer of the fluid from one tank to another or through action of the vaporized fluid on a diaphragm which, in turn, causes rotor imbalance.

SUMMARY OF THE INVENTION

The thermodynamic power plant of this invention differs from any of the prior art engines or motors mentioned above in the physical structure of its parts and its manner of functioning. Thus, although it includes a wheel-like rotor that turns under the influence of gravity as a result of weight imbalance, the rotor alone does not *completely* confine a volatile liquid that causes the unit to rotate by alternate expansion or vaporization under the influence of heat and contraction or condensation upon being cooled to bring about the imbalance, such as taught in U.S. Pat. Nos. 1,911,456; 3,509,716 or 4,074,534, nor does it include a rotor with vapor chambers in which a volatile liquid is vaporized and a separate but interconnected condenser in which the resulting vapor is condensed for return to the vapor chambers. Instead, as will be seen, in my novel power plant arrangement a volatile liquid in a closed loop system, which includes a rotatable wheel-like rotor, is fed to the rotor in vapor form; circulated from the rotor through a radiator to a reservoir; pumped as a liquid from the reservoir to a solar heated or the like, where it is vaporized; and then returned to the rotor, by way of an accumulator, as a vapor.

The unique power plant of this invention comprises, in its preferred form, six major units or components. These include the above-mentioned rotor, radiator, reservoir, solar heated, pump and accumulator components. The rotor, as previously indicated, is of generally wheel-like form, including a hollow rim, hollow spokes and a hollow hub divided into three compartments. The hollow rim has a plurality of arcuate segments separated from each other by partitions, and there is a one-way valve between each pair of adjacent segments which, as will be seen, permits fluid to flow in a predetermined direction within the rim for a reason presently to be explained. Each of the rim segments is connected to the hub by one of the hollow spokes. This spoke serves as a conduit for the transfer of fluid from the hub to that segment, or in the opposite direction, again as will be explained. The hub structure comprises two interfitting parts, one of which remains stationary and the other of which is rotatable with respect thereto. The stationary part of the hub includes a shaped divider partly cylindrical in form which runs from side to side through the greater part of the hub interior. This divider has two vane-like segments integral with its cylindrical portion and diverging outwardly therefrom as seen in cross section. A web integral with the divider divides the area within its cylindrical part and between its diverging vane-like segments into two generally symmetrical hollows. The hub has an outer wall of cylindrical form comprising its rotatable part. This outer wall is integral with the aforesaid spokes and embraces the stationary part of the hub in sealing relationship to turn in bearing contact therewith. In addition to the two symmetrical hollows within the hub structure either side of the aforesaid web, there is a third hollow comprising that space within the hub on the opposite side of the divider from the side to which the web is joined.

The rotor is provided with means to permit its installation in vertical position. A necked enclosure at one end of the hub structure forming part of the stationary part of the hub has two ports leading to the respective hollows either side of the web within the hub. The lower of these two ports is adapted to receive an inlet fluid line and the upper of the ports, an outlet line. The outlet line leads to the aforesaid radiator. The sectorial portion of the outer hub wall between the two diverging vane-like segments of the divider within the hub interior encompasses an area sized to accommodate openings of two of the hollow spokes. These spokes run outwardly from the hub to the rim of the rotor to permit the flow of fluid between the hub and rim. At its outer end, each of the spokes intersects the rim near a partition between two of the rim segments. The design of the rotor hub is such that the input fluid to the hub, in vapor form, flows to the rim from the lower of the two generally symmetrical hollow spaces divided by the web partition in said hub.

The hollow rim of the working rotor is preferably half filled with the aforesaid fluid in its liquid form. When the rotor is at rest, this liquid fills the lower half of the rim. At start-up of the motor, input fluid in vapor form under pressure is fed into a rim segment just above the liquid level in the rim. The one-way valve between that segment and the next lower one will open under the pressure of the vapor, allowing the vapor to flow into the adjacent rim segment containing the liquid. This initiates a chain of events in which the liquid is forced under pressure through certain of the spokes into higher rim segments, thus bringing about a weight imbalance of the rotor, which then turns under the influence of gravity in a direction to swing the higher rim segments with the liquid to lower positions. As the rotor turns, the rim segments are sequentially vented to the upper generally symmetrical hollow space within the hub through the spokes interconnecting the rim segments and the hub, and the fluid in those segments (mostly vapor) then flows outwardly from the hub and into the line connecting it with the aforesaid radiator. Heat is removed from the fluid in the radiator and it is condensed to a liquid therein. The turning rotor can be harnessed to a load to do useful mechanical work by means of a chain, belt or the like.

From the radiator the condensed fluid is passed to the reservoir. From the reservoir, it is pumped, to the solar heater by a specially designed pump having a stepped piston reciprocally movable within a cylinder. The piston is spring-loaded to hold it in one extreme position in which there is a space between a concentrically reduced end and an integral end closure for the cylinder. There is an inlet port into this space through which vaporized fluid from the solar heater can be fed into the cylinder. Spring force holds the piston in said extreme position against pressure from the vaporized fluid acting on the concentrically reduced end of the piston. When the pressure builds up to a sufficient extent in the aforesaid space within the cylinder, the spring force is overcome, and the piston is urged toward an opposite extreme position. When that occurs, an inlet port for liquid from the reservoir is exposed and the liquid flows into a space within the cylinder forward of an annular shoulder around the base of that part of the piston of concentrically reduced form. As the piston moves to said opposite extreme position it uncovers an outlet port for the vaporized fluid from the solar heater in communication with a conduit to the accumulator. The vapor then flows from the pump cylinder through this conduit. At the same time, another port permitting the inflow of pressurized vapor from the accumulator into the cylinder on the opposite side of the piston from the side in contact with the vapor from the solar heater is uncovered, and this causes the piston to move back to its original position, where it is held by the aforesaid spring force until vapor from the solar heater again overcomes that force. When this occurs, the liquid from the reservoir is pushed by the annular shoulder through an outlet port in the cylinder and into the solar heater, where it is subjected to heat from the sun and vaporized therein. As the liquid vaporizes, the vapor passes up into the cylinder until its pressure forces the piston away from its first extreme position against the spring pressure holding it there, and the above-described sequence of operations is repeated.

The accumulator is of the bellows type, and has a weight on top to compress the vaporized fluid therein to a desired pressure. A feed line leads from the accumulator to a constant pressure valve and another line from there to the rotor. This insures a supply of vapor at a desired pressure to the rotor wherein it serves the above-described purpose of causing the migration of liquid within its hollow rim to unbalance the rotor and cause its rotation.

It is thus an object of this invention to provide solar motor means for converting solar energy into mechanical energy capable of doing useful work.

Another object of the invention is to provide such means having a closed-loop system of fluid transfer wherein a volatile fluid is automatically passed into a hollow rotor in vapor form to cause rotation of the latter through migration of the fluid in liquid form therewithin.

Other objects, features and advantages of the invention will become apparent in the light of subsequent disclosures herein.

DESCRIPTION OF PREFERRED EMBODIMENT

Figure 1:
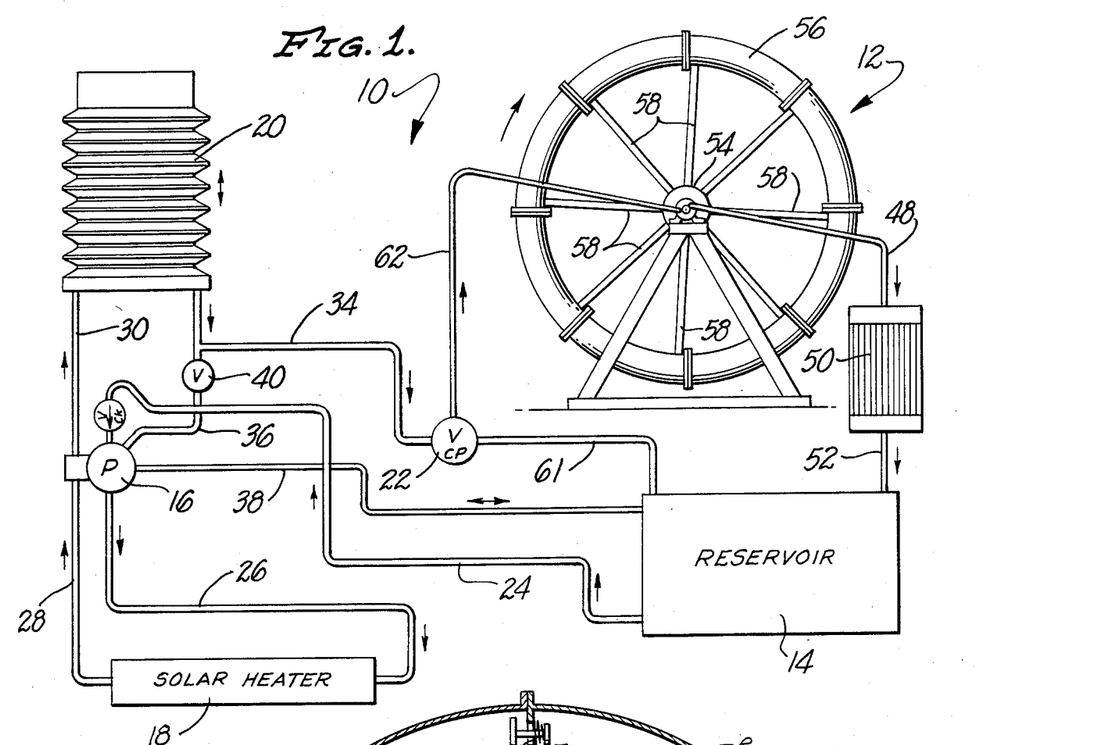
FIG. 1 is a schematic diagram of a preferred form of solar power plant system in accordance with this invention.

Considering now the drawings in greater detail, there is shown in FIG. 1 a schematic diagram of solar power plant means 10 of preferred form in accordance with this invention. The power plant set-up preferably employs, as a driving force, a volatile fluid such as methylene chloride or a fluorinated hydrocarbon of the type used as a refrigerant and commonly referred to as Freon. Examples of Freon refrigerants include dichlorotetrafluoroethane, dichlorodifluoromethane and monochlorodifluoromethane. The invention is not limited to the use of such fluids, however, and others, such as, for example, water, can be employed within its scope.

The aforesaid fluid is confined to a closed-loop made up of various components forming the power plant system. These components include a rotor 12, a radiator 50, a liquid reservoir 14, a pump 16, a solar heater 18 and an accumulator 20. When the solar power plant is in operation, liquid refrigerant or the like from reservoir 14 flows through a conduit 24 to the pump 16 from whence it is pumped through another conduit 26 to the solar heater 18. In the solar heater, the liquid is vaporized and passes back to pump 16 through a line 28. The pump 16 has a spring-loaded piston 92 in a cylinder 94 (see FIG. 5) against which the vapor from the solar heater exerts force. This pressure causes the piston to move against the spring force and expose a hollow 120 in cylinder 94 to an inlet port for liquid from the reservoir 14. For a reason soon to be explained, the piston then reciprocates to its original position, thereby forcing the liquid through conduit 26 and into solar heater 18. The piston continues to reciprocate the pump liquid from reservoir 14 into the solar heater. At the same time, as will be explained, vapor from the solar heater pulses from pump 16 to accumulator 20 through a line 30. As previously indicated, the accumulator is weight-biased in order to keep the gas pressure therewithin at a predetermined level.

The accumulator 20 is in communication with the rotor 12 by means of conduits 34 and 62, as shown. The flow of the vapor into the rotor at the desired pressure level is controlled by a pressure release valve 22 in a manner presently to be explained. A branch line 36 leads from line 34 to the pump, and an outlet line 38 connects the pump with reservoir 14. A needle valve 40 in line 36 is adjustable to control the flow of vapor through that line. The vapor passes through pump 16 from line 36 to line 38 in the manner hereinafter described.

Figure 2:
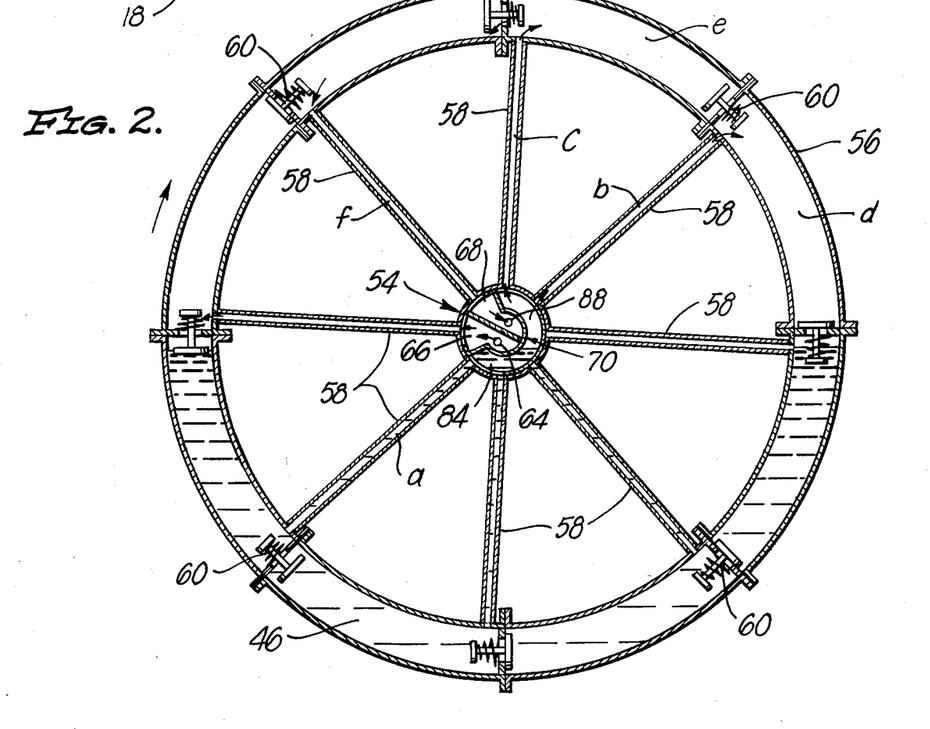
FIG. 2 is a side elevational view, mostly in section, of a rotor forming a major part of the power plant system, charged with a volatile liquid and shown at rest.
Figure 4:
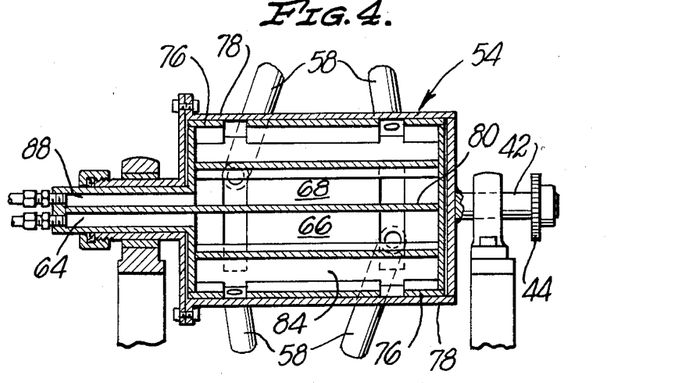
FIG. 4 is a longitudinal sectional view of the hub, taken along line 4—4 of FIG. 3.

The rotor 12, as previously indicated, is of wheel-like form and has a substantially hollow interior. Feed vapor is admitted into a compartment in the hub of the rotor where is exerts pressure on liquid in its rim in such a way as to cause weight imbalance of the rim through migration of the liquid therearound in a manner subsequently to be described in greater detail. As a result of this imbalance, the wheel rotates in a clockwise direction, as seen in the FIG. 1, to turn a power shaft 42 to which a load can be harnessed by means of a sprocket 44 (see FIG. 4). Alternatively, a pulley could be used in lieu of sprocket 44. It is desirable, for reasons which will become evident, for the liquid level within the rim of rotor 12 to fill that rim about half way up each side when the rotor is at rest, as illustrated in FIG. 2 where the liquid is shown at 46. The liquid and vapor in the system are preferably different phases of the same fluid, so there will always be an inflow of the fluid in vapor form into the operating rotor and an exhaust of that fluid, mostly in vapor form, therefrom. This exhaust fluid passes through a line 48, a radiator 50 where the vapor therein loses heat and condenses, and a line 52 from the radiator to reservoir 14. Thus, as will now be evident, so long as the sun is out, liquid refrigerant or the like can be pumped from reservoir 14 into the solar heater 18 wherein it is vaporized and the resulting vapor then passed through pump 16 and into the accumulator 20 from where it flows to the rotor 12 as pressurized vapor. This pressurized vapor can then act on the liquid in the rotor to cause imbalance and rotation of the latter. The system is thus a self-contained power plant which needs only energy from the sun to effect a continuous operation thereof.

Figure 7:
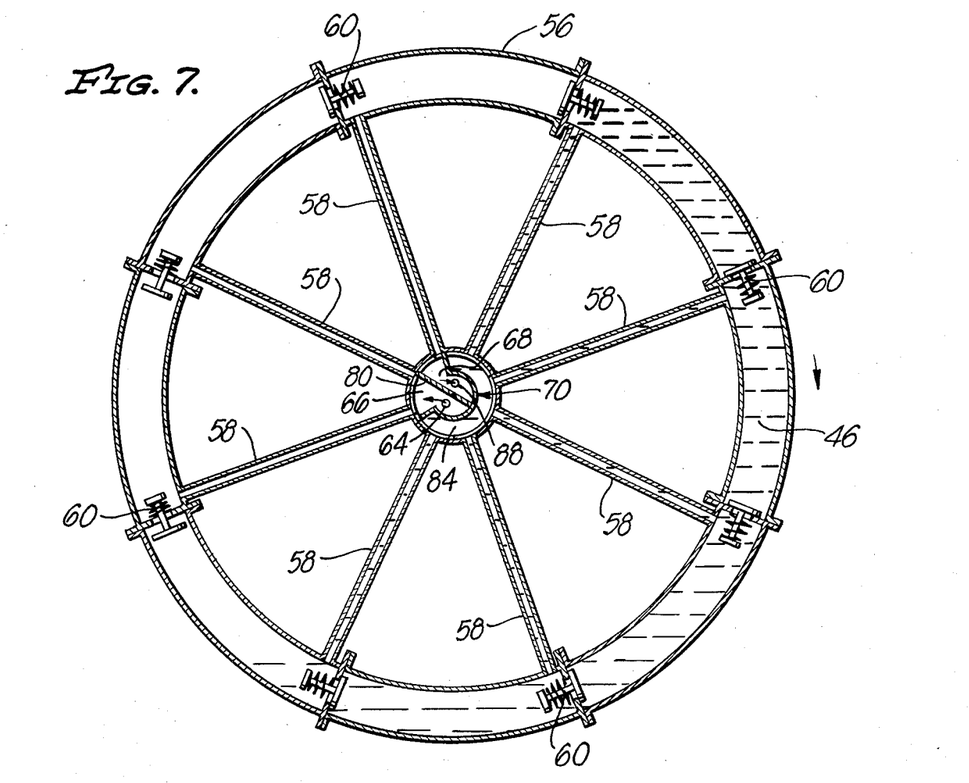
FIG. 7 is a side elevational view of the rotor similar to FIG. 2, but showing the volatile liquid disposed in unbalanced relationship therein to cause rotation thereof.

FIGS. 2, 3, 4 and 7 show the internal structure of the rotor 12, FIG. 2 illustrating the distribution of liquid therewithin at the instant of start-up, and FIG. 7 showing the liquid distribution after the rotor is in operation. The rotor has three main parts, a hollow hub 54 divided into three compartments, a hollow rim 56 and eight hollow spokes 58. The rim is divided into 8 arcuate segments by 8 partitions, each with a one-way valve 60 therein. The hollow spokes 58 interconnect the hub 54 and rim 56, the point of connection with the rim in each case being near a partition with a one-way valve 60, as illustrated in FIGS. 2 and 7. The rotor works most effectively when its hollow interior is about half full of liquid, again as illustrated in FIG. 2, which shows the rotor at rest with the liquid substantially filling the lower half of hollow rim 56 and those other portions of the rotor interior below the liquid level.

When pressurized vapor is fed to the rotor 12 at rest by pressure release valve 22, the vapor passes through a line 62 and into the hub of the rotor through an inlet port 64 to which it is connected. Inlet port 64 opens into a compartment 66 in the hub. Compartment 66 is one of two generally symmetrical compartments in the hub, the other one being shown at 68 (see FIGS. 2, 4 and 7), partially bounded by a transverse partition 70 having, as seen in cross section, a circular segment 72 and a pair of outwardly extending, diverging walls 74, which walls terminate at a cylindral enclosure 76 to which they are integrally affixed. The cylindrical enclosure remains stationary at all times, as will be seen, and it is provided with window openings sized and positioned to open the hub interior to the hollow spokes to permit the flow of fluid between the rim compartments of the rotor and the hub for proper operation of the device as the spokes rotate around the hub. The hub 54 includes, in addition to the stationary cylindrical enclosure 76, a cylindrical rotatable member 78 from which the spokes 58 radiate. The cylindrical enclosure 76 serves as a bearing or pivot for the member 78 as the rotor turns during operation of the solar motor system. Dividing the area bounded by the partition 70 and cylindrical enclosure 76 into generally equal parts is a web 80 integrally joined to the circular segment 72 of partition 70 along a portion of one edge and to the cylindrical enclosure 76 along a portion of the other edge.

Figure 3:
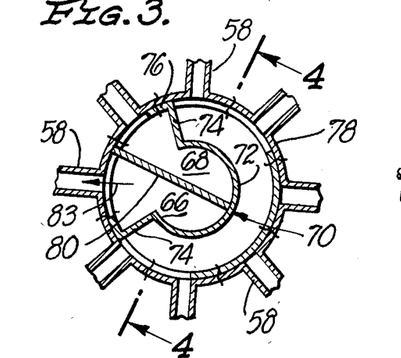
FIG. 3 is an enlarged, stepped cross-sectional view of a hub forming part of the rotor.

When the pressurized vapor enters the hub compartment 66 through inlet port 64 it flows from that compartment into the hollow spoke 58 in communication with that compartment between the web 80 and the lower wall 74 of the partition 70, as indicated by the arrow 83 in FIG. 3. The eight partitions in the hollow rim 56 referred to above, and illustrated in FIGS. 2 and 7, divide the rim into eight arcuate compartments. Each of the partitions within the hollow rim is fitted with a one-way valve 60 permitting a flow of pressurized fluid through the rim from one compartment to another in the counterclockwise direction, as viewed in FIGS. 2 and 7. Each of the eight compartments in the rim is in intermittent communication with the hub interior, by means of one of the eight hollow spokes, as the rotor turns. At their inner ends, the spokes are integral with the rotatable hub member 78, the wall of which is penetrated by openings for the spokes to permit communication between the internal hub compartments and each spoke when that spoke is aligned with any of the window openings of enclosure 76 for that purpose.

The spokes 58 extend inwardly in alternately diverging directions from a common plane at their outer ends to the hub 54 for better structural stability of the rotor. See FIG. 4, which shows this feature of the spokes in a longitudinal sectional view of the hub. As will now be clear, the hub 54 has an inner, stationary structure, including the partition 70, web 80 and cylindrical enclosure 76, and an outer rotatable part comprising the cylindrical member 78 which is integral with the spokes 58.

After the pressurized vapor from compartment 66 enters the spoke 58 to which it has access, it passes through the hollow interior of that spoke and into the rim compartment with which the spoke communicates. It then exerts opening pressure on the one-way valve 60 at the lower end of that compartment and passes into the next lower compartment, which at start-up of the motor is filled with the liquid 46 (see FIG. 2). The vapor pressure acting on the liquid exerts a downward force thereon, but this force is not sufficient to open the valve 60 submerged in the liquid in that compartment so it cannot move the liquid in a counterclockwise direction within the hollow rim. Consequently, the liquid seeks escape through the hollow spoke 58 in communication with the rim compartment in which the vapor encounters the liquid, which spoke is shown at a in FIG. 2. In addition to the compartments 66 and 68 in the hub 54, there is a third compartment 84 on the opposite side of partition 70 therein.

When the pressurized vapor forces liquid from the hollow rim 56 into the spoke 58 at position a in FIG. 2, the liquid travels up into compartment 84 in the hub, from there through the first available spoke open to the hub interior, as exemplified by the spoke at position b in FIG. 2, and from there into the rim compartment with which that spoke is in communication, as indicated by the appropriate arrows on FIG. 2. Also, the liquid can be forced upward into and through the next hollow spoke counterclockwise from the spoke at position b, this spoke being shown at position c in FIG. 2, and into the rim compartment with which that spoke is in communication. As a result of this, the liquid migrates from compartments in the lower left quadrant of hollow rim 56 of the rotor, as seen in FIG. 2, into compartments in the upper right quadrant of the rim. The resulting displacement of liquid is illustrated in FIG. 7, and it causes an imbalance of the rotor to bring about clockwise rotation thereof under the influence of gravity. The continuous feeding of the pressurized vapor into the hub 54 results in a continuous pressure on the liquid in the rotor such as to cause a state of continuing imbalance, which results in continuous rotation of the rotor as long as the vapor is fed into its hub.

As will be apparent, continuous operation of the rotor 12 requires a continual removal of exhaust vapor to make way for a constant inflow of feed vapor to keep the rotor running. As the vapor forces the liquid upwardly from the lower left quadrant to the upper right quadrant of the rotor, as seen in FIGS. 2 and 7, the vapor travels upwardly as well as the liquid, and finds its way into rim compartments such as those shown at d and e in FIG. 2. There, the vapor exerts pressure on the one-way valves 60 permitting flow of the vapor in a counterclockwise direction within the rim. As the rim rotates, the lower end of the spoke connecting each rim compartment with the hub passes from communication with the hub compartment 84 into communication with hub compartment 68. The spoke shown at position f in FIG. 2, is in such communication with compartment 68. When that occurs, the vapor in that rim compartment, as well as any liquid entrained in the vapor, flows into compartment 68. From there, the fluid escapes from the hub through an outlet port 88 and into a line 48 to the radiator 50 (see FIG. 1). The radiator 50 is designed to effectuate sufficient heat loss from the vapor to return it, through a line 52, to reservoir 14 in substantially liquified form.

Figure 5:
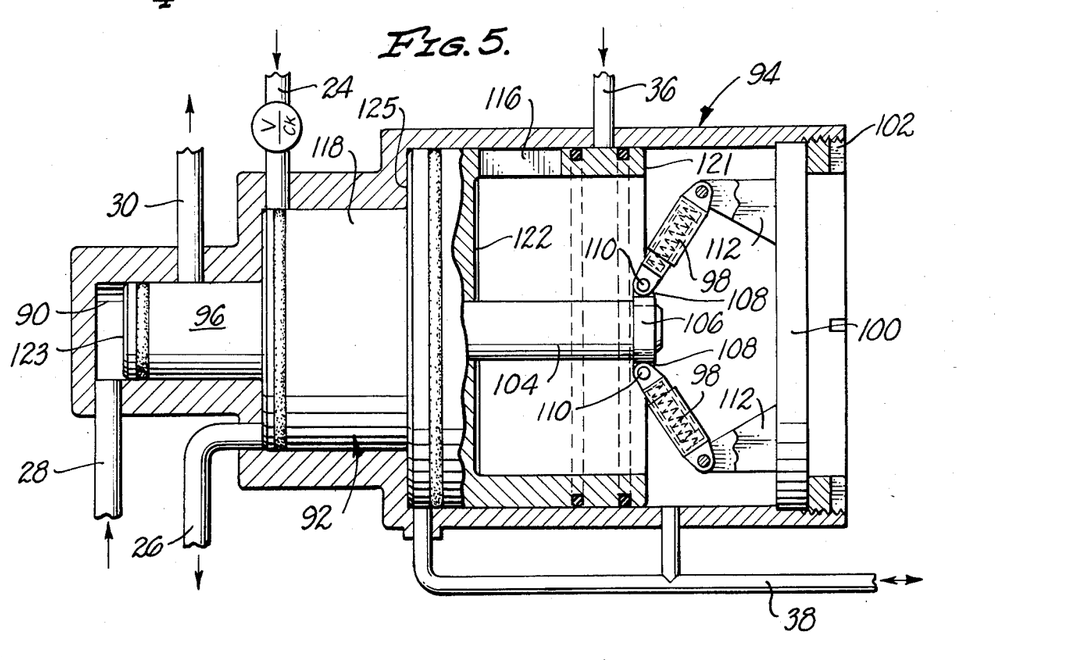
FIG. 5 is a longitudinal view, partly in section, of a fluid pump forming part of the power plant system, and showing a piston in one extreme position of movement therewithin.

As previously indicated, liquid from reservoir 14 passes through line 24 to the pump 16, which then pumps it to the solar heater 18 wherein it is vaporized by solar heat for return to the pump 16 where it provides energy to keep the pump in operation, and from thence to the accumulator 20 for eventual return to the rotor 12. The solar heater is of conventional parabolic trough design, not necessary to describe in detail here. The illustrated system works only while the sun is out, but a backup heat source of some sort can be incorporated therein to permit its continued operation at night or during cloudy weather, if desired. The vaporized fluid from solar heater 18 passes through the line 28 and into the compartment 90 in the left end of pump 16, as seen in FIG. 5. As previously indicated, the pump 16 has an internal piston 92 of annularly stepped configuration slidably mounted in the cylinder 94 which is designed to receive it in mating relationship.

As the vapor from solar heater 18 enters compartment 90 of the pump 16, it exerts an increasing pressure on the left end of the concentrically reduced part 96 of the piston 92. That piston is held in a first extreme position (shown in FIG. 5) by a pair of springs 98 interconnecting the right end of the piston with a closure plate 100 which is held in position by means of a locking ring 102 threaded around its outer periphery to engage an internally threaded portion of cylinder 94.

The piston 92 has a hollow base through which extends a concentric shaft 104 integral with the piston. The springs 98 are secured to this shaft by means of a collar 106 and a pair of oppositely positioned, apertured knuckles 108 to which the springs are pivotally attached by means of pivot pins 110, again as illustrated in FIG. 5. At their opposite ends, the springs are pivotally affixed to a pair of anchor lugs 112 integral with the closure plate 100. The anchor lugs 112 are positioned inwardly of the inner wall of the cylinder 94 far enough to provide clearance for the base of piston 92 in the extreme position illustrated in FIG. 6.

At start-up of the pump, the vapor entering compartment 90 of cylinder 94 exerts pressure on the exposed end of the reduced portion 96 of the pump piston which soon overcomes the resistance of springs 98 and urges the piston to the right, as viewed in FIG. 5. As a result, the springs are compressed and swiveled to the positions illustrated in FIG. 6 by the moving piston. As the piston is urged by the vapor pressure in compartment 90 to its FIG. 6 position, the open end of line 30 to accumulator 20 is exposed and vapor flows into that line toward the accumulator. Also, as piston 92 moves to its FIG. 6 position a slot 116 in the wall of its hollow base comes into registry with the open end of the line 36. This permits pressurized vapor from the accumulator to enter the hollow base portion of piston 92.

Figure 6:
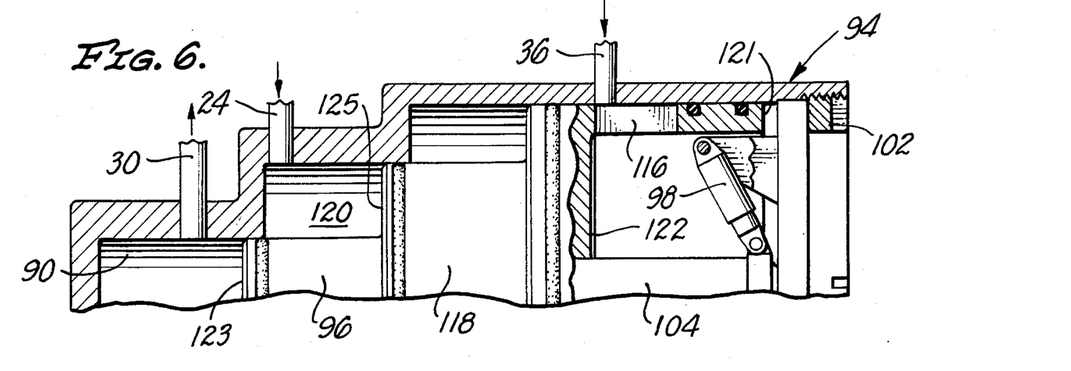
FIG. 6 is a fragmentary portion of a view of the pump similar to FIG. 5, but showing the piston in its opposite extreme position within said pump.

As the piston 92 travels to the right under the influence of the vapor pressure on the end of its reduced segment 96, a segment 118 intermediate in diameter between segment 96 and the base portion of the piston also moves to the right to uncover an outlet for the line 24 from reservoir 14 into a cavity 120 in the cylinder. Cavity 120 is exposed as the piston moves to the right, and is under a vacuum which sucks liquid from line 24 thereinto. When the piston reaches the limit of its travel to the right, where it is positioned as shown in FIG. 6, vapor from line 36 flows through the slot 116, as previously indicated. This vapor exerts pressure on the bottom 122 of the hollow base of the piston, as well as on the rim 121 of the hollow base. Because, as FIG. 5 shows, the combined areas of bottom 122 and rim 121 are greater than the areas of the exposed forward end of the reduced segment 96 of the piston, shown at 123, and the annular shoulder on segment 118 at the base of segment 96, shown at 125, there is an imbalance of pressure on the piston which forces it left to the position shown in FIG. 5. As the piston moves leftward, it pushes the liquid in cavity 120 out through line 26 to the solar heater. When the piston reaches its limit of travel to the left, the opening for line 36 into the hollow base of the piston is again sealed off, as is the opening for line 30 from the cylinder to accumulator 20. Thus, vapor entering compartment 90 in cylinder 94 exerts pressure on the end 123 of segment 96 of the piston to force it, against the pressure of springs 98, back to the right again. As this occurs, the above sequence of events is repeated until vapor from line 36 once more enters the cylinder and forces the piston to reciprocate to its extreme left position. This reciprocating action causes a pulsating flow of liquid from reservoir 14 to the solar heater, resulting in continuous vaporization of the liquid in that heater to provide vapor pressure for operation of the pump 16.

Figure 8:
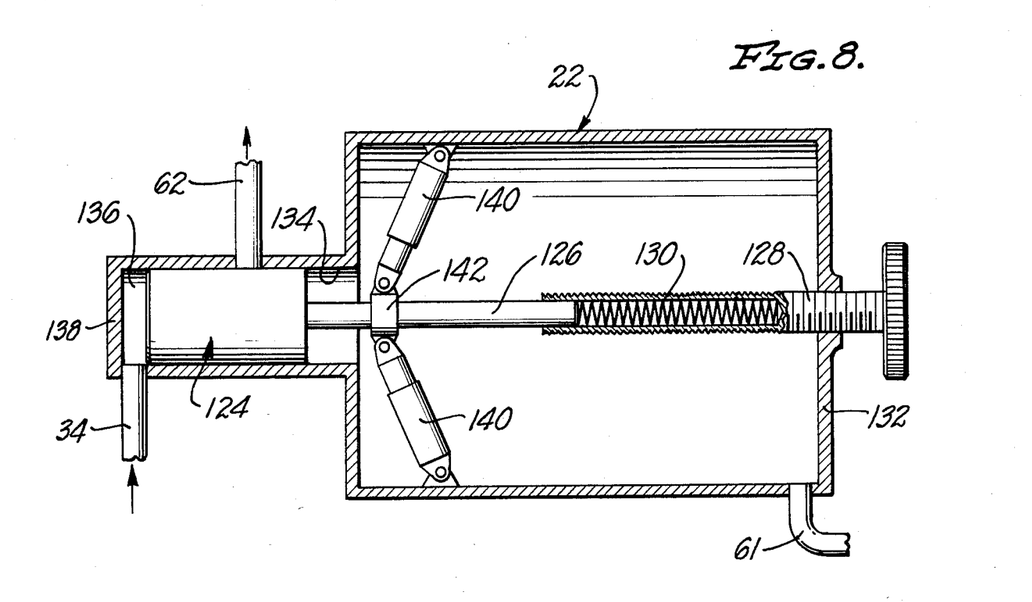
FIG. 8 is a view, mostly in longitudinal section, of a spring-loaded valve incorporated in the power plant system between an accumulator component thereof and said rotor for controlling the flow of pressurized vapor into the rotor to cause its rotation.

As previously indicated, the feeding of pressurized vapor from accumulator 20 to rotor 12 is automatically controlled by the pressure release valve 22. The inner workings of that valve are illustrated in FIG. 8, and consist of a piston 124 with an integral piston rod 126 which fits telescopically within a hollow, spring-loaded tension adjusting screw 128 to abut against a compression spring 130 in the screw. The screw threadedly engages a tapped opening in an end closure 132 of a housing for the valve, whereby the tension in the spring 130 can be adjusted as desired to control the pressure of vapor passing through the valve. The piston 124 is reciprocal within a cylindrical portion 134 of the valve 22, and it has a limit of travel toward the left, as seen in FIG. 8, such as to leave a space 136 in the left part of the cylindrical portion, which is enclosed at its outer end by an integral closure 138. When the pressure of vapor entering the hollow space 136 through line 34 is sufficient to overcome the tension of spring 130, it urges the piston 124 to the right. A pair of spring-loaded shock absorbers 140 are pivotally mounted within the valve housing, as illustrated in FIG. 8, and serve to help guide the piston rod 126 in a straight pathway as it moves in and out of the hollow screw 128. These shock absorbers are pivotally fastened, at their inner ends, to a collar 142 tightly fastened around the piston rod. When piston 124 moves far enough to the right, as seen in FIG. 8, it uncovers an outlet into the line 62 to rotor 12. Then the pressurized vapor flows directly through the pump from line 34 to line 62 and as long as there is sufficient vapor pressure to maintain the piston clear of the opening for line 62 the vapor will continue to flow to the rotor and the system will continue to operate.

In order to clear the right end of cylinder 94 of pump 16 of the pressurized vapor that has entered through line 36, and permit the piston to again move to the right under the force of vapor pressure from the solar heater in compartment 90 of the cylinder, an opening into the line 38 is exposed when piston 92 nears its left extreme postion. Thus, just before the piston is ready to reverse direction and travel to the right, pressurized vapor in its hollow right portion is vented into line 38 to reduce the resistance within the pump cylinder to such piston travel. The space around the reduced segment 118 of the piston when the latter is in its FIG. 6 position is also vented to line 38 (see FIG. 5).

The manner in which the solar motor system of this invention fucntions should, it is believed, be clear from the above description and the accompanying drawings. The accumulator 20 is, as previously indicated, weighted at the top to maintain a desired pressure in the vapor passing therethrough and this assures that properly pressurized vapor is admitted to the rotor 12 to cause its rotation in the above-described manner. The pressure release valve 22, as previously indicated, remains open so long as the pressure in the vapor passing through it remains above a predetermined level. The springs 140 in that valve serve the purpose of snapping the valve shut should the pressure of the vapor from accumulator 20 drop below that level. A line 61 provides ventilation between the pressure release valve housing and reservoir 14. The rotor will run at full speed as long as the pressurized vapor from accumulator 20 is fed to it through the pressure release valve. If the vapor pressure drops below the above-indicated level for one reason or another, the valve will snap shut. The rotor will therefore never run at less than full speed.

While the solar motor system of this invention has been herein described in terms of reference to a preferred embodiment, it should be understood that the invention is not limited to that particular embodiment, but is broad enough in scope to include various modifications thereof. For example, the rotor could have other than 8 spokes and rim compartments, if desired. The heart of the invention resides in its rotor unit, and any suitable substitute for any of the other components making up the system such as, for example, the pump 16, could be used in lieu thereof without exceeding the reach of my inventive concept. Also, instead of a single fluid such as employed in the system illustrated in the attached drawings, two separate fluids, one in liquid form and the other a gas, could be employed to operate my rotor unit. Although I have throughout this specification referred to my novel motor system as a solar motor system and to the heater component of the system as a solar heater is should be understood that this language has been employed in an exemplary, rather than a limitative, sense, and that another type of heating means could be substituted for the solar heater in the preferred form of the system if desired. These modifications, and others occuring to those skilled in the art in the light of the present teachings, are all within the scope of my invention, so long as they are encompassed by the language of the following claims.

I claim:

1. Motor means comprising a fluidtight, gravity-actuated rotor of generally wheel-like form having a substantially hollow rim, a substantially hollow hub and fluid passage means therebetween, said rotor being adapted for rotation in an upright position around a horizontal axis when in use;

said hub having a fluid inlet port and a fluid outlet port and said rotor being internally shaped to insure the movement of a compressed gas therethrough from the fluid inlet port to the fluid outlet port whereby when said compressed gas is introduced into said hub through said fluid inlet port and said rotor is positioned for use with a quantity of a suitable liquid incompletely filling the space therewithin, said compressed gas flows into contact with the surface of said liquid on one side of the vertical diameter of the rotor and exerts pressure thereon to cause movement of the liquid into space within said substantially hollow rim on the side of said vertical diameter opposite to said one side to thereby bring about a weight imbalance in said rotor causing is to rotate under the influence of gravity in a direction tending to relieve the imbalance as long as the compressed gas is fed into said hub through said inlet port.

2. Motor means in accordance with claim 1 in which said fluid passage means comprises a plurality of hollow spokes interconnecting said substantially hollow rim and said substantially hollow hub.

3. Motor means in accordance with claim 2 in which said substantially hollow rim is divided into a plurality of compartments by means of an equal plurality of transverse partitions, each of which partitions is fitted with a one-way valve adapted to open under the pressure influence of said compressed gas to permit the gas to make contact with the nearest surface of said liquid after it flows into said substantially hollow rim during operation of said motor means.

4. Motor means in accordance with claim 3 in which the number of said hollow spokes is equal to the number of said compartments within said substantially hollow rim and each spoke interconnects a separate one of said compartments with said substantially hollow hub.

5. Motor means in accordance with claim 4 in which said substantially hollow hub has internal partition means dividing it into three compartments into a first of which compartments said inlet port opens, out of a second of which compartments said outlet port leads and through the third of which compartments and said hollow spokes there is fluid communication between said hub and said rim to permit the movement of said liquid from that part of said rim in which the liquid surface is under the pressure influence of said compressed gas to that part of the rim in which it causes said weight imbalance of said rotor.

6. Motor means in accordance with claim 5 in which said hub comprises an inner, stationary part including an apertured wall of generally cylindrical form and an outer cylindrical drum rotatably mounted on said apertured wall, whereby the latter serves as a bearing for said cylindrical drum during operation of said rotor.

7. Motor means in accordance with claim 6 in which said cylindrical drum is integrally formed with said hollow spokes and is apertured at the inner ends of said spokes to permit the flow of fluid between said hub and said spokes.

8. Motor means in accordance with claim 7 in which the generally cylindrical stationary wall part of said hub has window openings positioned to permit the sequential introduction of said compressed gas, through properly positioned spokes as they rotate around said hub during operation of said motor means, to each of the rim compartments as it comes into position to receive the gas for proper passage thereof to the appropriate surface of said liquid within said rim on which to exert said pressure to create said weight imbalance of said rotor for proper operation of said motor means.

9. Motor means in accordance with claim 1 in which a single fluid can serve both as said liquid and said compressed gas, said motor means also including:

reservoir means for holding a quantity of said fluid in liquid form;

heating means for vaporizing liquid from said reservoir; and     accumulator means for receiving the vaporized fluid and maintaining it at a suitable pressure for use in said rotor;

said motor means also including cooperating fluid conveyance means whereby the motor means confines said fluid to a closed loop within which it circulates and changes phase between its liquid and gaseous forms as required for continuous operation of said rotor.

10. Motor means in accordance with claim 9 including pump means for pumping said liquid from said reservoir means into said heating means.

11. Motor means in accordance with claim 10 including constant pressure valve means situated between said accumulator means and said rotor to insure that said compressed gas is fed from said accumulator means to said rotor only when it is at a desired pressure level.

12. Motor means in accordance with claim 11 in which said pump means includes an annularly-shouldered piston slidably disposed in a cylinder, said piston being reciprocative between movement in a first direction under the influence of pressure in vaporized fluid from said heating means, and movement in a second direction under the influence of compressed gas from said accumulator means, whereby an annular hollow within said cylinder partially defined by an annular shoulder on said piston expands and contracts as the piston reciprocates and moves said shoulder back and forth;

said motor means including means for admitting liquid from said reservoir means to said hollow as it expands and for effectuating the outflow of said liquid from said hollow to said heating means as the hollow contracts.

13. Motor means in accordance with claim 12 in which said heating means comprises solar heating means.

14. Motor means in accordance with claim 13 including radiator means adapted to receive exhaust gas from said rotor for purposes of causing its condensation to a liquid.

15. Motor means in accordance with claim 14 in which said rotor has eight spokes.

16. Motor means in accordance with claim 15 in which said spokes diverge outwardly in alternately opposite directions from a common plane at their outer ends to hub positions at their inner ends of equal distance from said plane.

17. Motor means in accordance with claim 16 in which said solar heating means is of parabolic trough design.

18. Motor means in accordance with claim 17 in which said accumulator means comprises a bellows-type accumulator weighted at the top to maintain said compressed gas therewithin at a suitable pressure level for feeding to said rotor.

19. Motor means in accordance with claim 18 in which said pump means is spring-loaded when inactive whereby vapor from said solar heating means must overcome spring force on the piston to cause its movement in said first direction within said cylinder, from whence it is then urged by pressure in the gas from said accumulator in said second direction back to its spring-loaded position, which cycle is continuously repeated to cause reciprocation of said piston for successful operation of said pump means.

* * * * *

UNITED STATES PATENT AND TRADEMARK OFFICE
CERTIFICATE OF CORRECTION

PATENT NO.   :   4,570,444

DATED        :   February 18, 1986

INVENTOR(S)  :   WALTER GOULD

It is certified that error appears in the above-identified patent and that said Letters Patent is hereby corrected as shown below:

Column 1, line 55, change "suppoting" to --supporting--. Column 2, line 25, change "heated" to --heater--; and line 31, change "heated" to --heater--. Column 5, line 27, change "the" to --and--; and line 48, change "is" to --it--. Column 10, line 19, "fucntions" should read --functions--. Column 11, line 22, "is" should be --it--.

Signed and Sealed this

Twenty-first Day of February, 1989

Attest:

DONALD J. QUIGG

*Attesting Officer*   *Commissioner of Patents and Trademarks*